United States Patent Office 3,442,085
Patented May 6, 1969

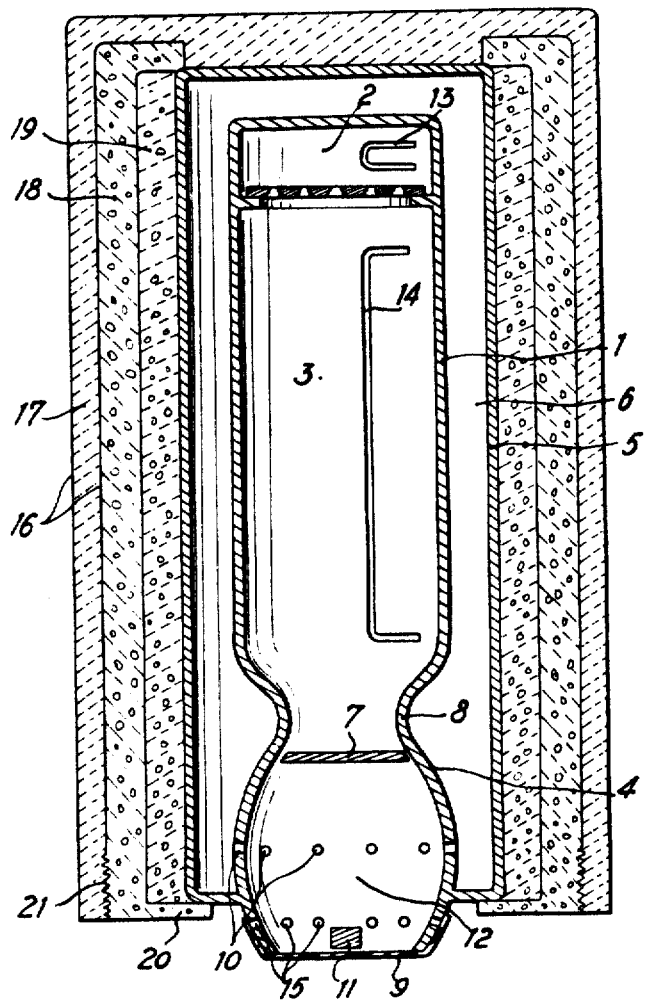

3,442,085
IMPULSOR WITH POWDER CHARGE, PARTICULARLY FOR PERCUSSION VIBRATIONS TESTS
Robert Victor Bancelin, 45 Rue Prou, 78 Clayes-sous-Bois, France
Filed June 30, 1967, Ser. No. 650,445
Claims priority, application France, July 8, 1966, 68,741
Int. Cl. F02k 9/04; F01m 9/00
U.S. Cl. 60—253                                        4 Claims

ABSTRACT OF THE DISCLOSURE

The present invention is concerned with an impulsor or small powder reactor adapted more particularly for fixing to a structure in which percussion vibrations are to be generated in order to study vibrations generated in this structure, and applicable more particularly for the study of vibrations of different parts of an aircraft during flight. According to the invention the impulsor comprises a thermally insulating coating formed by several concentric layers of substances melting at high testing temperatures and having melting points graduated so as to delay during successive melting periods the transmission of heat to the body of the impulsor.

---

The invention relates to a small reactor with a powder charge, usually called an impulsor or gas generator, adapted to be mounted on a structure in which the range of vibrations caused by shock excitation is to be studied, and adapted particularly for flight tests of the vibrations of various parts on an aircraft, such as the wings, the tail unit, the ailerons and the like. The excitation of a range of vibrations in parts of this kind requires, for obtaining a suitable shock effect, that the combustion of the powder charge of the impulsor should be produced in a very short time, being of the order of a few milliseconds, and independently of external conditions, in order to obtain coherent measuring results. However, the combustion of the powder charge in these devices is strongly affected by the temperature of the charge prior to the ignition. Flight tests with modern aircraft are to be effected under widely varying conditions between temperatures ranging from —60° C. for subsonic speeds at altitudes of the order of 10,000 metres up to +125° C., caused by air friction at speeds of the order of Mach 2 at altitudes of 20,000 metres and with atmospheric pressures ranging from 56 millibars up to 1050 millibars. If the impulsor has a very low temperature, such as —60° C., the combustion of the powder is much slower so that the percussion effect is not obtained under the required conditions, whilst a high temperature above 100° C. can cause on ignition the explosion of the impulsor and hence serious damage.

The present invention has the object of protecting the impulsor against the effects of extreme high and low temperatures and to provide an impulsor characterized in that it comprises a thermally insulating coating, formed by several concentric layers of substances which melt at high test temperatures and having graduated melting points so as to delay, during the melting times of successive layers of these substances the transmission of heat to the body of the impulsor.

These meltable substances may be formed from salts or alloys.

According to a preferred embodiment, the thermally insulating coating is formed as a detachable outer envelope, containing a bad heat conductor, such as glass wool, and lined internally by one or more concentric envelopes, containing the meltable substances.

According to another embodiment, the impulsor comprises a body, formed by a tubular, double-walled vessel with a vacuum interspace so as to protect the charge against the effects of the ambient temperature.

The composite outer material may be raised, prior to its assembly on the impulsor, to a temperature favourable for protecting the powder charge, for example, maintained at a comparatively high temperature, or at a very low temperature, according to the conditions under which the test is to take place.

These measures make it possible to delay the transmission of cold or heat to the powder for a sufficient time, for example, for an hour, in order to enable the flight test to be carried out under good conditions, which are substantially the same under all circumstances.

The accompanying drawing shows, by way of example, and in axial cross section, an embodiment of the impulsor according to the invention.

As may be seen from the drawing, the actual impulsor is formed after the manner of a rocket by a tubular body 1, having at one end a precombustion chamber 2, containing the igniter (not shown), a center chamber 3, containing the powder charge, and at its other end a convergent-divergent tube member nozzle 4. Mounted on the tubular body 1 is a second concentrical envelope 5 spaced from the tube 1 by a space 6, from which the air is evacuated so as to form a heat barrier in the manner of a Dewar vessel, and fixed on the body 1 near the outlet of the tube 4 which exceeds slightly towards the outside beyond the double-walled tube 1–5 formed in this manner. In order to protect the charge against the effects of thermal flow by the tube, the latter is equipped, as known, with a diaphragm 7 fixed near the neck 8 of the tube and is also closed by an outer diaphragm 9 fixed at its end. The evacuated space 6 communicates with the nozzle 4 through a first series of holes 10 and the vacuum is formed by a device 11 supported by the outer diaphragm 9. The powder charge is therefore also protected from the side of the tube by a large vacuum chamber 12. During the firing, and after the removal of the inner diaphragm 7, the depression in the double envelope, communicating now with the combustion chamber, causes the complete combustion of the charge by aspiration.

In addition to the advantage of maintaining the powder charge at a temperature which is unaffected by ambient conditions, the construction of a double-walled impulsor lends itself for a number of applications in safety arrangements which form part of the invention. Thus, the precombustion chamber 2 and the chamber 3, containing the powder charge, may be equipped with breaking off lines or weak lines of rupture 13, 14, formed, for example, by electroerosion, having the form of a U with axis transverse to that of the impulsor so as to form at rupture under the effect of an overpressure vents directing the gases tangentially and giving them a rotary motion. The line of rupture 14 of the centre chamber may be more resistant than line of rupture 13 in the ignition chamber. In fact, the gases which have escaped through the latter form already in the space 12 a counterpressure which tends to compensate for the effects of the internal pressure on the tube 1.

On the other hand, the vacuum chamber 12 could contain a powdery substance which is drawn in by the gases of the jet across the members 10 during the combustion. This substance can be so chosen that it increases the mass of the jet gases and thus the thrust, or it may be formed by an extinguishing powder, preventing the combustion of the liquid fuel in the tank which might seep through to the tube, might be ignited by the hot gases and cause a fire. For the same purpose, the end of the tube 4, covered prior to the igniting by the outer diaphragm 9, may be equipped with a second series of holes 15 through which this fuel can enter into the tube under the action of the suction formed by the jet and can burn there, without the fire being able to be propagated towards the outside.

In order to delay even further the transmission of the thermal flux towards the powder charge of the impulsor, the double-walled tube 1–5 comprises preferably an outer coating formed by an annular cylindrical envelope 16, filled with a bad thermal conductor 17, such as glass wool, being preferably detachable, and adapted to be placed in position on the impulsor only at the last moment so that it can be given preliminarily a temperature delaying the transmission of the heat. If the test is to be carried out under high temperature conditions at supersonic speeds, this envelope will first be cooled, whilst in the case of tests at subsonic speeds, it will first be heated.

This thermally insulating envelope is preferably internally lined with one or more concentric envelopes, such as 18, 19, containing meltable substances, salts or alloys, having preferably graduated melting points, rising from the outside towards the inside. In this way, the durations corresponding to the temperature barriers during the melting of these successive layers will delay the transmission of high temperatures caused by air friction along the outer wall of the envelope 16 at supersonic speeds to the double envelope 1–5.

The assembly of outer envelopes 18, 19 may be open at the top and has a flange 20 at the bottom, resting on the rim of the wall 5 of the double envelope, whilst the outer envelope 16 formed at the top, is introduced from the top onto the impulsor 1–5 and may be fixed to the envelope 18, for example, by screws 21, so as to assemble the whole with the body of the impulsor.

What I claim is:

1. A powdered impulse generator adapted to be fixed to an aircraft flight surface for determining the vibration characteristics thereof, comprising an elongated inner tube adapted to contain a charge of powder, a precombustion chamber at one end of said inner tube and a nozzle at the other end of said inner tube, the said nozzle being coaxial with said tube and having a convergent portion, a neck portion and a divergent portion, a first series of holes distributed in the wall of the divergent position along a first circle, a second series of such holes distributed along a second circle in the wall of the said divergent portion and axially spaced from the said first series of holes, an envelope coaxially engaged over said inner tube, in spaced relation therewith and having a collar fixed to the outer wall of the said divergent portion of the nozzle, at a level intermediate between said first and second circles of holes, a first diaphragm disposed at the level of the said neck portion, a second diaphragm mounted over the outer end of said divergent portion and covering the holes arranged along the said second circle, a device supported by said second diaphragm within the divergent portion for forming therein and between the inner tube and the said envelope a vacuum, a series of concentric layers surrounding said envelope, said coatings being made of substances melting at testing temperatures and having decreasing melting points from the innermost layer to the outermost layer, and a removable outer coating made of an insulating material engaged over the outermost layer.

2. A powdered impulsor generator according to claim 1 wherein the wall of the elongated inner tube and the wall of the precombustion chamber each comprises a U-shaped breaking off line whereby, on combustion, tangential flaps are obtained to impart to the gases resulting from the combustion a rotary motion.

3. A powdered impulse generator adapted to be fixed to an aircraft flight surface for determining the vibration characteristics thereof, comprising an elongated inner tube adapted to contain a charge of powder, a precombustion chamber at one end of said inner tube and a nozzle at the other end of said inner tube, the said nozzle being coaxial with said tube and having a convergent portion, a neck portion and a divergent portion, a first series of holes distributed in the wall of the divergent portion along a first circle, a second series of such holes distributed along a second circle in the wall of the said divergent portion and axially spaced from the said first series of holes, an envelope coaxially engaged over said inner tube, in spaced relation therewith and having a collar fixed to the outer wall of the said divergent portion of the nozzle, at a level intermediate between said first and second circle of holes, a first diaphragm disposed at the level of the said neck portion, a second diaphragm mounted over the outer end of said divergent portion and covering the holes arranged along the said circle, a device supported by said second diaphragm within the divergent portion for forming therein and between the inner tube and the said envelope a vacuum, a series of concentric layers surrounding said envelope, said coatings being made of salts and having decreasing melting points from the innermost layer to the outermost layer, and a removable outer coating made of an insulating material engaged over the outermost layer.

4. A powdered impulse generator adapted to be fixed to an aircraft flight surface for determining the vibration characteristics thereof, comprising an elongated inner tube adapted to contain a charge of powder, a precombustion chamber at one end of said inner tube and a nozzle at the other end of said inner tube, the said nozzle being coaxial with said tube and having a convergent portion, a neck portion and a divergent portion, a first series of holes distributed in the wall of the divergent portion along a first circle, a second series of such holes distributed along a second circle in the wall of the said divergent portion and axially spaced from the said first series of holes, and envelope coaxially engaged over said inner tube, in spaced relation therewith and having a collar fixed to the outer wall of the said divergent portion of the nozzle, at a level intermediate between said first and second circle of holes, a first diaphragm disposed at the level of the said neck portion, a second diaphragm mounted over the outer end of said divergent portion and covering the holes arranged along the said circle, a device supported by said second diaphragm within the divergent portion for forming therein and between the inner tube and the said envelope a vacuum, a series of concentric layers surrounding said envelope, said coatings being made of alloys and having decreasing melting points from the innermost layer to the outermost layer, and a removable outer coating made of an insulation material engaged over the outermost layer.

References Cited

UNITED STATES PATENTS

| 2,522,113 | 9/1950  | Goddard | 60—255    |
| 2,544,422 | 3/1951  | Goddard | 60—255    |
| 3,010,399 | 11/1961 | Manning | 89—1      |
| 3,130,940 | 4/1964  | Erb et al. | 102—105 |
| 3,218,850 | 11/1965 | Rogallo | 73—147    |
| 3,236,476 | 2/1966  | White.  |           |
| 3,279,193 | 10/1966 | Webb    | 102—105 X |

SAMUEL W. ENGLE, *Primary Examiner.*

U.S. Cl. X.R.

60—200, 264; 73—12, 147; 89—1